United States Patent [19]

Rudolph et al.

[11] Patent Number: 4,815,273
[45] Date of Patent: Mar. 28, 1989

[54] SINGLE PROPELLER TURBOPROP PROPULSION APPARATUS

[76] Inventors: Peter K.C. Rudolph, 13683 18th Ave. SW., Seattle, Wash. 98166; Grazyna B. Ostrom, 5858 S. 292nd, Auburn, Wash. 98001

[21] Appl. No.: 948,325

[22] Filed: Dec. 31, 1986

Related U.S. Application Data

[63] Continuation-in-part of Ser. No. 815,447, Dec. 31, 1985, Pat. No. 4,817,382.

[51] Int. Cl.[4] ............................................. F02C 3/10
[52] U.S. Cl. .................................. 60/39.161; 416/171; 74/801
[58] Field of Search .............. 60/226.1, 39.31, 39.161; 416/171, 170 R; 74/801

[56] References Cited

U.S. PATENT DOCUMENTS

| | | | |
|---|---|---|---|
| 3,401,580 | 9/1968 | Sigg | 74/801 |
| 3,513,715 | 5/1970 | Whitfield | 74/801 |
| 3,559,507 | 2/1971 | Wagner | 74/801 |
| 4,488,399 | 12/1984 | Robey et al. | 416/171 |
| 4,704,862 | 11/1987 | Dennison et al. | 60/226.1 |

FOREIGN PATENT DOCUMENTS

| | | | |
|---|---|---|---|
| 1079264 | 8/1967 | United Kingdom | 60/226.1 |
| 1338499 | 11/1973 | United Kingdom | 60/226.1 |

Primary Examiner—Donald E. Stout
Attorney, Agent, or Firm—Hughes, Cassidy & Multer

[57] ABSTRACT

There is a core engine having a turbine section which is drivingly connected to a single propeller through a planetary transmission. The core engine provides a substantially continuous, axially aligned gaseous flow path from the inlet to the discharge nozzle, with the planetary drive being spaced radially from the flow path. In one configuration, the planetary transmission is spaced circumferentially around the flow path, while in another configuration, it is positioned inside of the annular flow path. The engine is ranged in both a tractor and a pusher configuration.

36 Claims, 10 Drawing Sheets

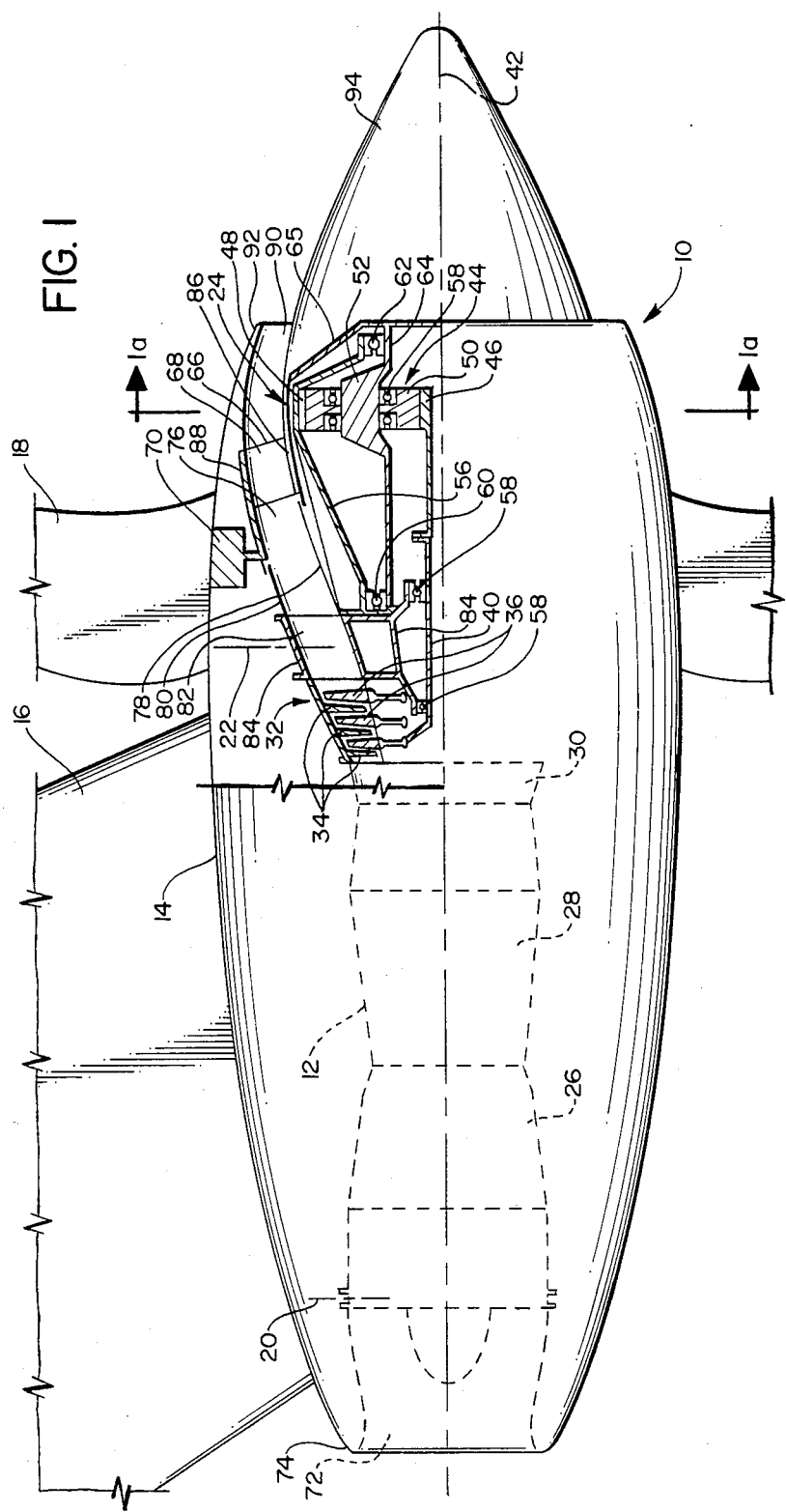

SINGLE PROPELLER TURBOPROP PROPULSION APPARATUS

RELATED APPLICATION

This application is a continuation-in-part of application No. 815,447 filed Dec. 31, 1985, and now U.S. Pat. No. 4,817,382.

BACKGROUND OF THE INVENTION

1. Field of the Invention

The present invention relates to a turboprop propulsion apparatus for an aircraft.

2. Background Art

Turboprop engines are commonly designed to drive either a single row of propellers or two rows of counter rotating propellers, and the propeller(s) can be mounted forward of the engine (called the "tractor" installation) or rearwardly of the engine (called the "pusher" installation). The advantage of the pusher system over the tractor arrangement is that in the pusher arrangement, the engine has an efficient free stream inlet, and the high speed propeller jet does not impinge on airplane or nacelle surfaces, thus avoiding scrubbing drag. Also, a pusher engine installation on the aft body of an airplane avoids the cabin noise problems that wing mounted tractor nacelle engines may cause. However, there is a major drawback of the pusher arrangement in that it is difficult to find a convenient location for the gas turbine exhaust.

There are a number of possibilities to alleviate the problem of the gas turbine exhaust in the pusher arrangement. What would appear to be a relatively simple solution would be to build an exhaust upstream of the propellers. This exhaust could be annular or lobed. However, for either case, the nacelle skin downstream of the exhaust and the lower part of the propeller blades would have to be designed for elevated temperatures caused by the hot exhaust gases. Also, these components may also have to be built from fireproof materials to withstand a brief fire during a wet start.

Another possibility for the primary exhaust is to duct the flow through a mount strut and discharge it at another location (e.g. through the fuselage of the airplane at an aft location). However, this solution involves the weight and cost of a long steel duct, possibly insulated, and the performance loss associated with the pressure drop in a long, eliptical duct. Further, the engine nacelle would have a relatively long configuration, since the elements would normally be arranged in series (these elements being the inlet, gas generator, power turbine, exhaust collector, gear box, and propeller(s)).

Contrary to the pusher engine installation, tractor turboprop engine installations have no exhaust problem, but inlet problems. This is particularly true for the in-line arrangement commonly used for high performance airplanes. In the in-line arrangement, the engine, the gear box and the propellers are all arranged along a common centerline. The power turbine at the rear end of the engine drives a power shaft through the center of the engine. The reduction gearing and the propellers are forward of the gas generator. In order to provide an air inlet for the gas generator, the reduction gearbox has to be located well forward of the engine face. This makes for a large overhang of the gearbox and propellers with the associated structural weight penalties. The engine inlet in this form of a tractor arrangement is either an S-shaped scoop inlet or a curved annular inlet. Both of these inlet types have high inlet pressure losses and cause high inlet pressure distortions.

In general, both the pusher and tractor configurations of a turboprop engine have problems relative to the total gaseous flow into, through and from the engine.

A search of the patent literature has disclosed a number of patents relating to turboprop engines or the like. These are as follows.

U.S. Pat. No. 2,478,206—Redding shows a turboprop engine where there are two counter-rotating propeller rows mounted directly to counter-rotating turbine blades.

U.S. Pat. No. 2,504,414—Hawthorne shows a turboprop engine where there are two counter-rotating blade rows driven from two separate turbine sections. In another embodiment, the counter-rotating blade rows are driven from counter rotating turbine members in the same turbine section.

U.S. Pat. No. 2,505,660—Baumann discloses a turbine engine where air propelling blades are driven directly from rotating turbine portions.

U.S. Pat. No. 2,526,409—Price discloses in FIGS. 2 and 8 a gear drive system for driving counter-rotating propellers. There is a stationary spider on which a plurality of planet gears are mounted, with the turbine driving the planet gears about stationary axes of rotation. The planet gears engage an outer ring gear which rotates one set of blades in one direction, and the planet gears also rotate an inner gear which is connected to the second counter-rotating propeller. In FIG. 3 of that planet, there is a plurality of sets of radial flow turbine blades attached to prospective propeller blades.

U.S. Pat. No. 2,526,941—Fishbein shows a gas turbine system for an aircraft where counter-rotating propellers are driven from a gear box.

U.S. Pat. No. 2,541,098—Redding shows a gas turbine where the propeller is driven from the turbine section.

U.S. Pat. No. 2,663,517—Price shows a particular type of mounting structure for a turboprop engine.

U.S. Pat. No. 2,663,749—Price, there is shown a gas turbine engine having a counter-rotating propellers. There is a gear drive positioned between high and low pressure compressor sections. This gear drive, in addition to drivingly interconnecting the two compressor sections, also has radially extending shafts which rotate outer pinion gears which in turn rotate a set of axially extending shafts 46. These shafts 46 act through gears at the ends of the shaft, one set of gears being connected to an outwardly positioned ring gear, and another set of gears being connected to an inwardly positioned ring gear. These two ring gears are each in turn attached to a respective set of propeller blades to cause the counter-rotation of the two sets of blades.

U.S. Pat. No. 2,702,985—Howell shows a turbine engine where the compressor section has two sets of compressor blades, both of which are rotatably mounted. One set of compressor blades is connected to a power turbine, while the second set of compressor blades is connected to a propeller. It would appear that in the embodiment of FIG. 1, the propeller is driven by the airflow produced by the blades powered directly from the turbine section, although the patent does not describe this in any great detail. In other embodiments, the propellers or blades are driven directly from the turbine.

U.S. Pat. No. 3,153,907—Griffith shows a power plant where different sets of propeller blades are driven from two separate engines.

French Pat. No. 934,469 (a translation of which is not presently available) shows a variety of duel propeller and single propeller arrangements in a turboprop engine.

By way of further background information, it is believed that a Russian turboprop aircraft, called the "Bear" has used a planetary gear system in connection with a turboprop engine having counter-rotating propellers. However, it is not known whether this is prior art with regard to the present invention, and the details of the construction of such an engine are not known to the applicant. However, this is mentioned to insure that the applicants are complying with their duty to disclose all potentially relevant prior art.

SUMMARY OF THE INVENTION

The turboprop propulsion assembly of the present invention first comprises a nacelle having a support structure. There is a gas generating and power section mounted in the support structure, and this has a longitudinally extending operating axis. This gas generating and power section comprises:
(1) a compressor means to receive intake air;
(2) a burner means to receive air from the compressor and burn fuel therein to create a gaseous combustion product;
(3) a turbine means having a turbine blade means centered on, and rotatable about, said operating axis.

The nacelle has a forward inlet and a rear exhaust nozzle, with the propulsion assembly defining a substantially continuous gaseous fluid flow path from said inlet through said gas generating and power section to the exhaust nozzle. A propeller is mounted for rotation at a mounting location radially outward of the flow path.

There is a planetary drive transmission comprising:
(1) an inner sun gear means of a relatively smaller diameter, mounted for rotation about said operating axis and operatively connected to the turbine means so as to be driven thereby;
(2) a ring gear means of a relatively larger diameter, positioned radially outwardly of the sun gear means and centered on the operating axis;
(3) a planetary means comprising planetary gear means rotatable about axis means generally parallel to the operating axis and drivingly interconnected between the sun gear means and the ring gear means, and further comprising planet carrier means operatively connected to the planetary gear means.

One of the ring gear means and the planet carrier means is mounted for rotation about the operating axis and also is drivingly connected to the propeller in a manner that rotation of the one of the ring gear means and the planet carrier means in response to be driven by the sun gear means causes rotation of the propeller.

The planetary transmission is positioned at a planetary location spaced radially from said flow path in a manner that gaseous flow through said flow path at said planetary location has a substantial alignment component which is axially aligned relative to said operating axis.

In some embodiments, the planetary drive transmission is positioned radially inwardly of the flow path, and there is connecting means extending from the one of said ring gear means and the planet carrier means through the flow path to connect to the propeller. In other embodiments, the planetary drive transmission is positioned radially outwardly of the flow path, and there is connecting means extending through the flow path the operatively connecting the turbine means with the sun gear means.

Also, in some of the embodiments, the flow path has a flow section positioned rearwardly of the turbine means, and the connecting means extends through said flow section. In this instance, in the preferred form, the connecting means comprises strut means contoured to react to gaseous flow from the turbine means to create a power input to the propeller.

In some embodiments, the propeller is mounted to the rear portion of the support structure in a pusher configuration. In other embodiments, the propeller is mounted to a forward portion of the support structure in a tractor configuration.

Further, in some of the embodiments, the flow path has a flow section positioned forwardly of the compressor means and there is connecting means connected between the one of the ring gear means and the planet carrier means through the flow section to connect to the propeller. In this instance, the connecting means comprises strut means contoured to react to gaseous flow into the compressor means to create a supercharging effect for the compressor means.

In some of the embodiments, there is in addition to the planetary drive transmission a planetary drive assembly interconnecting the turbine means and the sun gear of the planetary drive transmission. In one configuration, this planetary drive assembly is positioned radially inwardly of this flow path, and in another configuration, it is positioned radially outwardly of this flow path.

Also, in a preferred configuraion, the propulsion assembly has a primary mount by which the gas generating and power system, the propeller, and the drive transmission are mounted to the nacelle support structure. The primary mount is positioned immediately rearwardly of the turbine means and forwardly of the planetary drive transmission, with loads from the planetary drive transmission being transmitted to the primary mount. In another arrangement, this primary mount is positioned immediately forwardly of the compressor means and rearwardly of the planetary drive transmission.

It its further modifications, in one configuration the turbine means comprises a first compressor turbine section having a drive connection to the compressor means, and a separate free turbine section powered independently of the turbine compressor section and operatively connected through the planetary drive transmission to the propeller. In another configuration, the turbine means comprises at least one shared load turbine section having a drive connection to the planetary drive transmission to the propeller, and also having an operative connection to at least a portion of the compressor means.

In some of the embodiments shown herein, the ring gear means of the planetary transmission is connected to the support structure so as to be nonrotatable with respect thereto, and the planet carrier means is operatively connected to the propeller. In yet another configuration, the planet carrier means is mounted so as to be nonrotatable with respect to the support structure, while the ring gear means is drivingly connected to the propeller.

Other features will become apparent from the following detailed description.

BRIEF DESCRIPTION OF THE DRAWINGS

FIG. 1 is a partial sectional view of a first embodiment of the present invention, with a section being taken along the longitudinal center line of the engine of the first embodiment;

DESCRIPTION OF THE PREFERRED EMBODIMENTS

Figure 1A:
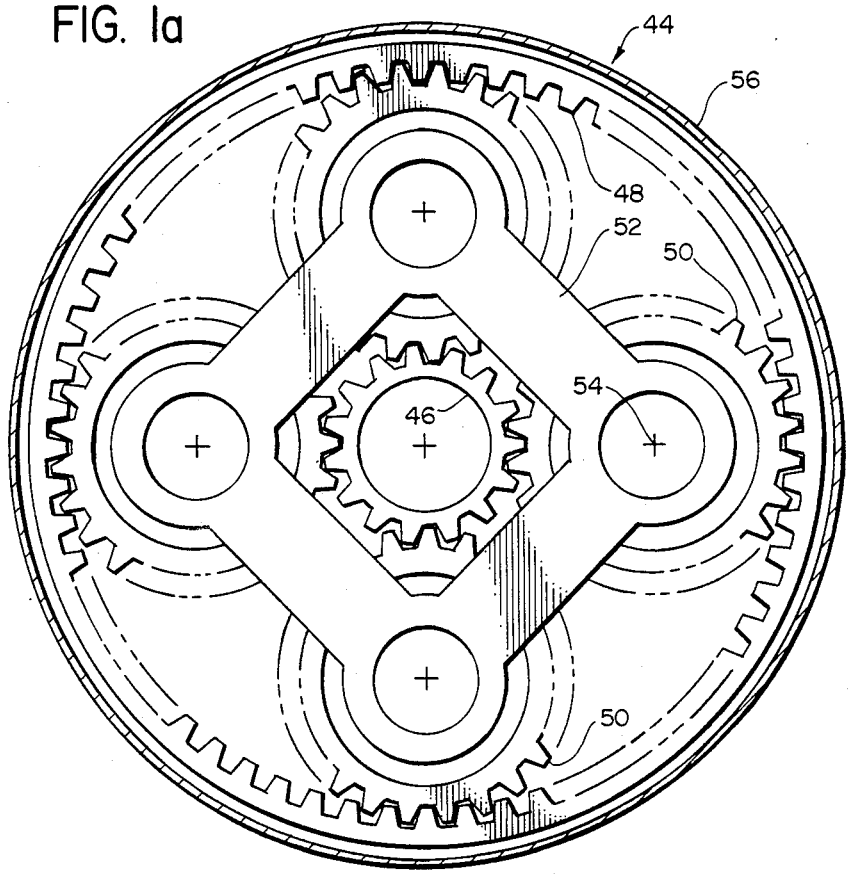
FIG. 1a is a sectional view taken along line 1a—1a of FIG. 1.

With reference to FIG. 1 and 1a, there is shown a first embodiment, generally designated 10, of the turboprop engine assembly of the present invention. This assembly 10 comprises a core engine 12 mounted in a nacelle structure 14 which is in turn mounted by means of a mount strut 16 to a fuselage or wing of an aircraft.

For convenience of illustration, neither the fuselage nor the wing are shown. There is a single propeller row 18 mounted in the rear portion of the nacelle structure 14 at a location rearwardly of the core engine 12 and the structure 16 (this abeing a "pusher" configuration, as opposed to a "tractor" configuration where the propeller is mounted at a more forward location). There are forward and rear mounts, 20 and 22, respectively.

Interconnecting the turboshaft engine 12 with the propeller 18 is a planetary drive transmission 24. The arrangement of this transmission 24, relative to the structure and operating components of the present invention, is considered to be especially significant in the present invention and will be discussed in more detail later herein.

The core engine or gas generator 12 is (or may be) in and of itself conventional, and this engine 12 comprises a forward compressor section 26, and intermediate burner section 28 and a rear compressor turbine section 30. The engine 12 can be either a single spool or a multiple spool engine. In addition, there is a power turbine 32 which drives the propeller 18.

Figure 8A:
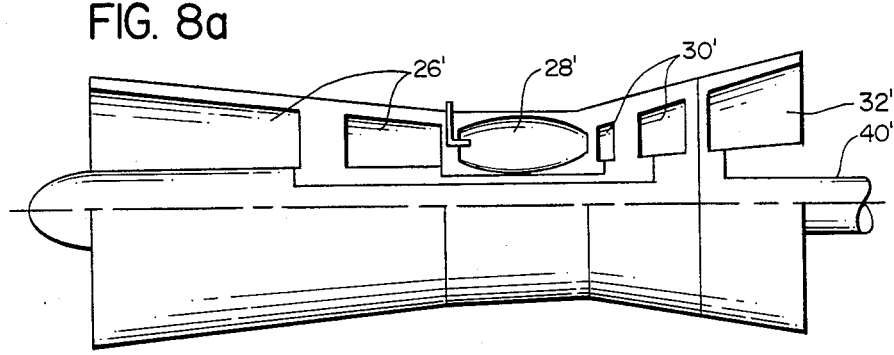
FIGS. 8a, 8b, and 8c are three schematic drawings of different versions of the gas generating and power section of the first embodiment of FIGS. 1 and 1a, with FIG. 8a showing a two spool turboshaft enging with a free power turbine, FIG. 8b showing a single spool turboshaft engine with a free power turbine, and FIG. 8c showing a two spool turboshaft engine with a "shared load" turbine.
Figure 8B:
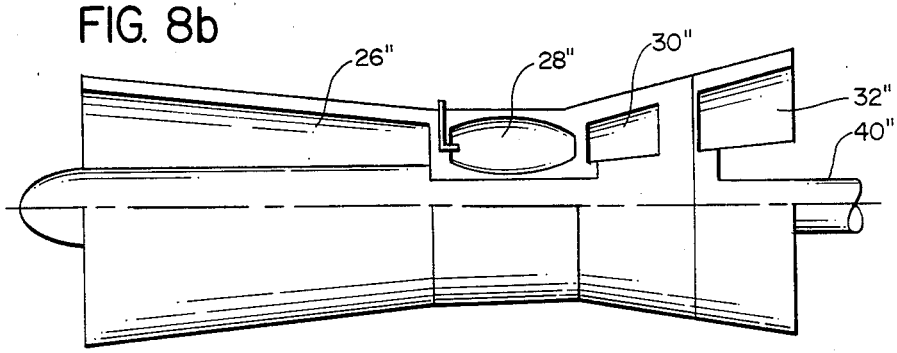
Figure 8C:
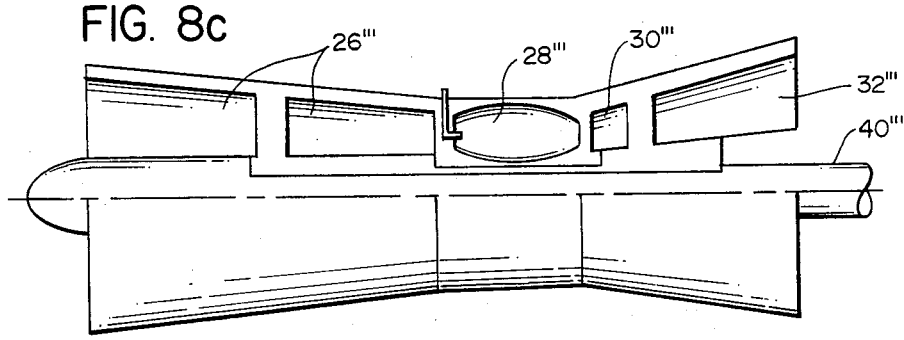

The core engine 12 can be either a single spool or a multiple spool engine, and three arrangements are illustrated in FIGS. 8a, 8b and 8c. In FIG. 8a, the compressor section 26 is in two parts 26', and the compressor turbine section is also in two parts 30', with each compression turbine part 30' being connected to a related one of the two parts of the compressor section 26'. The power turbine 32' is a free turbine, in that it does not have a direct connection to either compressor section 26'.

In FIG. 8b, there is shown the single spool gas generator with a free power turbine 32''. The compressor section 24'' is made as one rotating component, as is the compressor turbine section 30''.

In FIG. 8c, there is the two spool arrangement, with the power turbine being a shared load turbine. In this arrangement, the compressor section is made in two parts 26'''. The forward part 30''' of the compressor turbine is connected to the rear part of the compressor section 26''', while the shared load turbine 32''' is connected to the forward part of the compressor section 24'''.

With reference to FIG. 1, the burner section 28 performs its usual function of receiving the compressed intake air from the compressor section 26 and burning fuel therein to create a gaseous combustion product. The gaseous combustion product is in turn directed through the compressor turbine 30 to drive the same. Downstream of the compressor turbine 30 is the power turbine 32. This turbine 32 is, as shown in FIG. 1, a free turbine with three stages, having three sets of stationary guide vanes 34 and three sets of turbine blades 36. This is a disc-type turbine, and the three sets of blades 36 are connected to a drive member 38 that is in turn fixedly connected to a longitudinally extending drive shaft 40. This shaft 40 is centered on the longitudinal center line42 of the engine, this center line 42 being considered as the operating axis of the engine 12.

FIG. 1 shows the power turbine 32 as a free turbine, the sole purpose of which is to drive the propeller 18 through the drive transmission 24. However, any one of the three arrangements could be used, as shown in FIGS. 8a, 8b, and 8c. If the configuration of FIG. 8c were used, the rear low pressure shared turbine 32''' would have more stages, turns somewhat slower, and powers not only the propeller, but also the compressor. The drive shaft 40 would then extend also forwardly through the center of the engine to drive the forward low pressure part of the compressor section 24''', as shown in FIG. 8c. The high pressure rear part of the compressor section 24''' would be driven directly from the compressor turbine 38'''.

Whether the power turbine 32 is a "free turbine" or a "shared load turbine" has little effect on the basic concepts of the present invention, except that the differences in turbine rotational speed require somewhat different reduction ratios for the gear transmission 24. In describing the first embodiment and the other embodiments herein, it will be assumed that the power turbine 32 is a "free turbine", with the understanding that the shared load turbine configuration could also be used. Further, the core engine 12 and the free turbine 32 will be considered collectively as a gas generating and power section, which could be in any one of the forms shown in FIGS. 8A, 8B, and 8C.

To describe the transmission 24 more particularly, there is a single stage planetary gear assembly 44, comprising an inner sun gear 46, an outer ring gear 48, and a plurality of planet gears 50 which have tooth engagement with both the sun gear 46 and the ring gear 48. The planet gears 50 are mounted to a spider structure or planet carrier 52 in a manner that the planet gears 50 are maintained in proper spaced relationship relative to each other so that each of the planet gear 48 rotate about its respective center axis 54 (see FIG. 1A).

This gear assembly is mounted in a gear box 56 that is in turn connected to stationary structure that is part of the engine rear mount frame or exhaust casing. Suitable bearing members and seals are provided at appropriate locations. The bearings for the free turbine shaft 40 and the sun gear 46, which is fixably connected to the end of the shaft 40, are designated 58. The forward bearing for the spider or planet carrier 52 is designated 60, and the rear bearing designated 62.

As indicated previously, the sun gear 46 is fixably connected to the rear end of the aforementioned drive shaft 40, and is thus rotatable with it. The planet carrier 52 is connected to a relatively short planetary drive shaft 64 that extends through the rear end of the gear box 56 to attach to a rotatable conical shaft 65 that in turn connects through torque frame 66 in the form of blades 68 which in turn connect to a mounting ring 70 to which the propeller blades 18 are connected.

With the main operating components of the assembly 10 of the first embodiment having now been described, attention is now directed to the arrangement of the assembly 10 relative to the pattern of gaseous flow therethrough. The initial flow into the engine is the airflow into the inlet 72 at the forward end of the nacelle structure 14. This inlet 72 is defined by the forward annular lip 74 of the nacelle structure 14, and it will be noted that the inlet 72 is substantially unobstructed and is located and centered on the center operatig axis 42. Further, it will be noted that the inlet 72 is located so that it is not effected by the wash created by the propeller blades 18.

The gaseous flow through the core engine 12 is, as indicated previously, conventional. Thus, the air passing into the inlet 72 is compressed in the compressor section 26 and passed into the burner section 28. The air and combustion products from the burner section 28 then pass through the compressor turbine(s) 30 and the power turbine 32 into an annular passageway 76. This annular passageeway 76 is defined by inner and outer generally concentric walls 78 and 80, respectively. At the forward part of the passageway 76, there is a plurality of mounting struts 82 inside the turbine exhaust case 84 contoured so as to double as exit guide vanes to eliminate the rotational component of the gaseous flow from the turbine 32. The annular passageway 76 extends rearwardly from the struts 82 to the location of the blades 68 of the torque frame 66. The torque frame 66 is provided with inner and outer wall sections 86 and 88, respectively, that define that portion of the passageway 76 at the location of the torque frame turbine blades 68. These blades 68, in addition to functioning as power turbine blades to aid in driving the propeller blades 18, serve to interconnect the ring 72 with the torque frame 66.

Rearwardly of the torque frame blades 68, the passageway 76 extends outwardly around the rear portion of the gear box 56 and the planetary gear assembly 44. The passageway 76 terminates in the rear annular exhaust nozzle 90, having an outer annular edge 92 and a center plug. 94. As shown, the rear nozzle lip portion 92 and the plug 94 rotate with the propellers 18.

To describe the operation of the present invention, the air enters through the inlet 72 and passes through the core engine 12 in the manner described above, with the gaseous exhaust from the burner section 28 driving the compressor turbine 30, which powers the compressor section 24 and also supplies power to the free turbine 32, which, through the transmission 24, drives the propeller 18. The gaseous flow from the turbine section 32 then flows through the annular passageway 76 to exit from the nozzle 90. It can be appreciated that there is a continuous flow and straight passage from the inlet 72 through the engine 12, through the passageway 76 and out the nozzle 90, with the components and overall structure of this engine assembly being such that this overall flow pattern can be accomplished with relatively high efficiency. Even the flow through the aft portion of the passageway 76 can be utilized to act on the turbine blades/struts 68 to extract yet more power from the turbine exhaust so that this power can be delivered to the propeller 18.

With regard to load reactions, the center of gravity for the overall engine and propeller installation is close to the rear mount 22. It is therefore obvious that the rear mount 22 will react the larger part of the mass inertia and all of the thrust loads, while the forward mount 20 will only react the smaller loadscreated by the overhung weight of the gas generator. With the majority of the loads reacted through the turbine exhaust frame 84, this frame becomes the structural backbone with a strong outer shell and mount flanges, strong struts 82 and a strong internal structure. This structure is ideally suited to react the loads from the power turbine 38, the gear box 56 and the propeller 18. In many state-of-the art pusher turboprop arrangements, the gear box is cantilevered aft a long ways to allow space for an exhaust collector and an exhaust upstream of the propeller. In this configuration, the exhaust flow continues on axially and does not require space between turbine, gear box and propeller. The gear box and propeller are therefore located very close to the turbine exhaust frame 84. This makes for a very short load path and overhang distance for the gear box loads and the propeller loads relative to the main mounting point. This efficient load reaction will make this engine and transmission arrangement very light and short.

To describe the short load path situation more specifically, the bearing locations in FIG. 1 will be examined in more detail. The loads from the power turbine 32 are reacted in the two bearings 58, which is a very short load path. The load path from the sun gear 50 to the power shaft bearings 58 is only a moderate distance. The planetary reduction gear box 56 is mounted to the aft face of the exhaust case 84. The forward bearing 60 for the planet carrier 52 that drives the propeller 18 is located immediately adjacent to the rigid aft face of the exhaust case 84, but inside the ger box case 56. The wide spacing between the front and aft bearings 60 and 62 will reduce bearing loads.

In summary, the structural arrangement of the turboprop transmission apparatus of the first embodiment of FIG. 1 and 1B is extremely short coupled and provides a very efficient load path. This will minimize structural weight and reduce nacelle length for improved aerodynamic performance.

With regard to the transmission 24, an examination of the gear assembly 44 reveals that a quite effective speed reduction is accomplished in driving the propeller 18 from the shaft 40. As indicated previously, the sun gear 46 constitutes the power input to the gear assembly 44, while the planet gears and carrier 50-52 constitute the drive for the propeller 18. The ring gear 48 is fixedly connected to stationary structure (i.e. the gear box 56). In a typical configuration of this gear assembly 44, it would be quite practical to accomplish an eight-to-one speed reduction ratio from the shaft 40 to the propeller 18. For example, if the turbine speed were ten thousand revolutions per minute (rpm), the rotational speed of the propeller 18 could be approximately 1,250.

Figure 7:
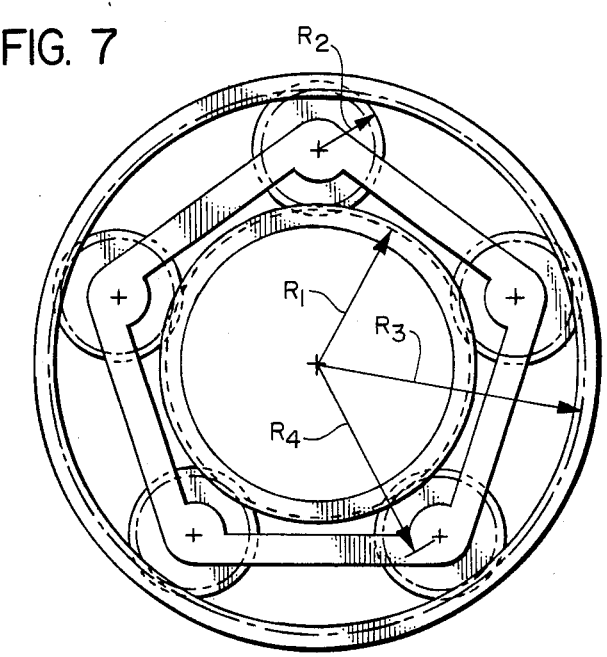
FIG. 7 is a schematic view of a planetary gear system to illustrate the mathematical formulas relevant to relative rates of rotation of the components of the system.

To analyze this further, reference is made to FIG. 7, where a planetary drive is shown somewhat schematically. The radius of the sun gear is indicated at R1; the radius of each planetary gear is indicated at R2 the radius of the ring gear is indicated at R3; and the radial distance from the center of rotation of the sun gear to the several centers of rotation of the planet gears is indicated at R4. For ease of illustration, the sun gear radius $R_1$ is made larger (relative to the other radii) than it would normally be in this first embodiment. We shall consider two cases, namely:

(a) where the ring gear is fixed and the sun gear is driven as the power input so that the planet carrier is the output (as in the present invention); and (b) where the planet carrier is held stationary, and the sun gear rotates as the power input so that the ring gear is the output.

In giving the formulas which indicate the relative rates of rotation, the following designtions are used, these being:

$N_1$ = the rotational speed of the sun gear $N_4$ = the rotational speed of the planet carrier.

In case "A" above, where there is a fixed ring gear and the output is through the planet carrier, the relative rates of rotation are in accordance with the following:

$$\frac{N_4}{N_1} = \frac{R_1}{R_1 + R_3}$$

In case "B" where the planet carrier is stationary, the relative rates of rotation are given by the following formula:

$$\frac{N_3}{N_1} = \frac{R_1}{R_3}$$

To work through this in terms of numerical values, let it be assumed that the sun gear has a radius of one unit, each of the planet geas has a radius of three units, so that the ring gear consequently has a radius of seven units. In the first case, where the ring gear is held stationary, the speed reduction ratio is eight-to-one. In the second instance, where the planet carrier remains stationary, the speed reeduction ratio is seven to one.

From the above analysis, it becomes apparent that as the radius to the sun gear is made smaller relative to the ring gear, the speed reduction ratio can be increased. Since in this first embodiment, the sun gear is located immediately adjacent to the main drive shaft 40, the radius of the sun gear 46 can be made relatively small.

Further, it can be seen that by making the planetary carrier 52 the drive member for the propeller 18, a somewhat higher speed reduction ratio can be achieved than in the situation where the ring gear 48 is made the power output member and the spider carrier 52 remained stationary. However, within the broader aspects of the present invention, it is to be recognized that it would be possible to make the ring gear 48 the drive member for the propeller 18, even though the higher gear reduction may not be achieved. This arragement is described in a seventh embodiment shown somewhat schematically in FIG. 9.

In describing the next five embodiments (i.e. embodiments 2-6), components which are similar to the first embodiment will be given like numerical designations, with letter suffixes distinguishing those of the additional embodiments. Thus, the components of the second embodiment will be distinguished by the suffix "a"; the third embodiment, shown in FIG. 3, will be distinguished by the suffix "b"; . . . and so forth until the sixth embodiment which will be distinguished by the letter suffix "3".

Figure 2:
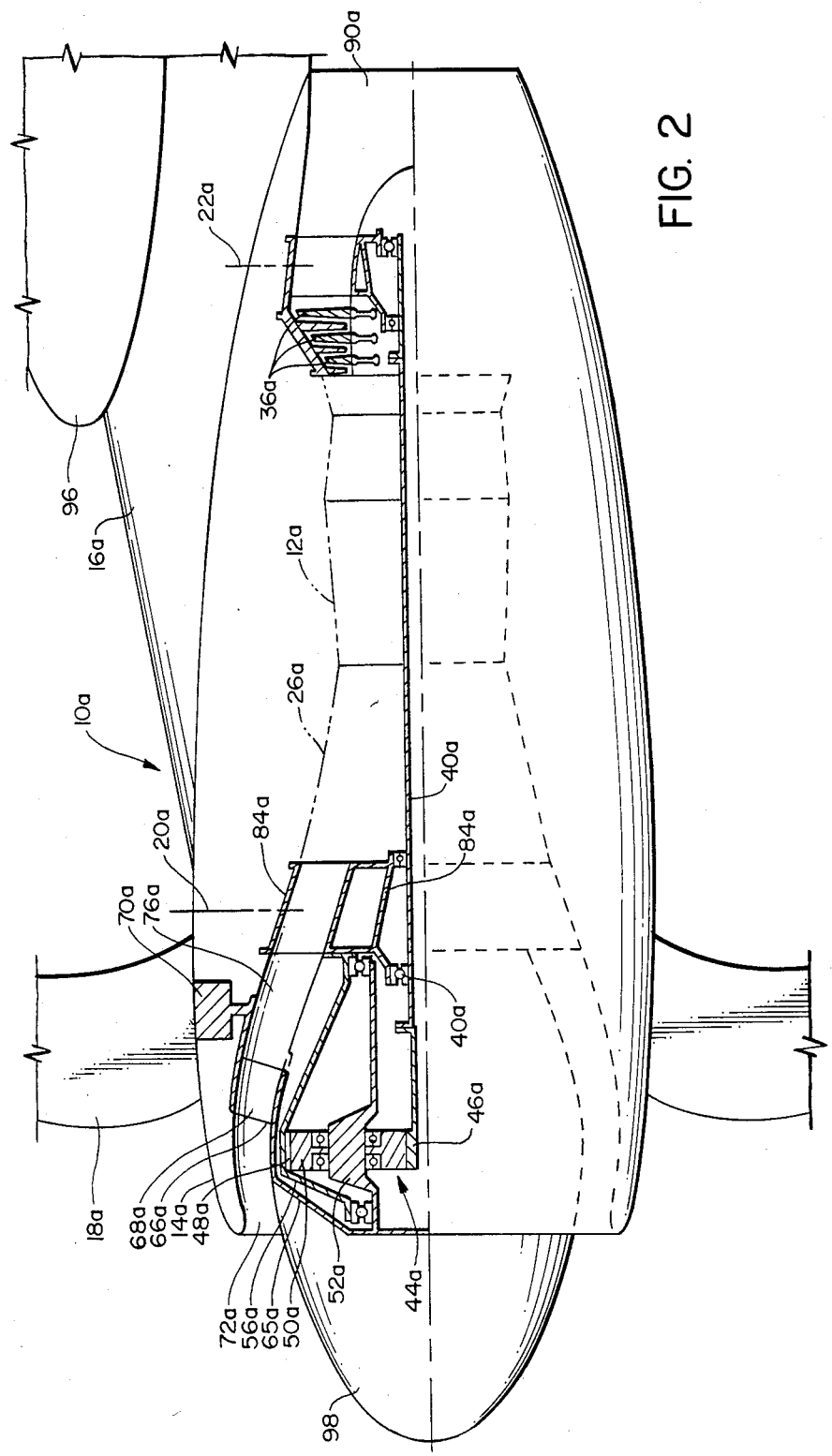
FIGS. 2 through 6 are sectional views similar to FIG. 1, illustrating further embodiments 2 through 6, respectively.

The turbo prop assembly 10a of the second embodiment is shown in FIG. 2, and this differs from the first embodiment of FIG. 1 in that the overall configuration is that of a tractor arrangement (where the propeller 18a is mounted at the forward part of the nacelle structure 14a). The general location of the planetary gear assembly 44a relative to the passageway 76a is substantially the same as in the first embodiment, except that in the second embodiment, the passageway 76a is an inlet passage to receive the inflow of air which passes into the inlet 72a, with this air passing through the passageway 76a to in turn pass into the compressor section 26a of the core engine 12a.

As in the first embodiment, the second embodiment has a sun gear 46a mounted directly to the drive shaft 40a. Further, the ring gear 48a, the planet gears 50a and the planet carrier or spider 52a are all located within the gear box 56a. The main strut 16a extends forwardly from the lower forward end of the wing which is shown at 96.

The drive shaft 40a extends through the middle of the core engine or gas generator 12a and is connected by its rear end to the power turbine blades 36a and extends forwardly to drive the sun gear 46a. It will be noted that as in the first embodiment, the continuous flow passage from the inlet 72a to the nozzle 90a is in general optimized for proper performance of the assembly 10a. More specifically, the inlet 72a remains substantially unobstructed; the flow through the passageway 76a does not entail any significant losses; and the flow through the core engine 12a to the nozzle 90a can be made conventional so as to optimize performance. With regard to the drive from the gear assembly 44a to the propeller 18a, this can be accomplished in substantially the same manner as in the first embodiment of FIG. 1.

The major differences of the second embodiment in FIG. 2 over the first embodiment of FIG. 1 are as follows:

The center of gravity has moved further forward. Therefore, the forward mount 20a takes the majority of the mount loads. The rear mount 22a reacts only the vertical and side loads from the aft engine weight.

The struts/blades 68a of the torque frame 66a (to which a spinner 98 is mounted) have changed to compressor stages which help boost engine compression ratio.

The close coupled relationship between the gear box 44a and the mount frame 84a is similar to the first embodiment.

The second embodiment has no temperature expansion problems for the torque frame 66a, along with the struts/blades 68a, and the propeller mount ring 70a, because the torque frame 66a operates in cold inlet air.

The inlet inner and outer surfaces are rotating with the propeller 18. There is no performance penalty to this.

The second embodiment solves the inlet problem commonly associated with "tractor" turbo prop installations.

The second embodiment is shown as a wing-mounted nacelle. The wing mount is the main reason to go to the tractor configuraton. However, the tractor could also be installed elsewhere, such as on the sides of the aft body.

Figure 3:
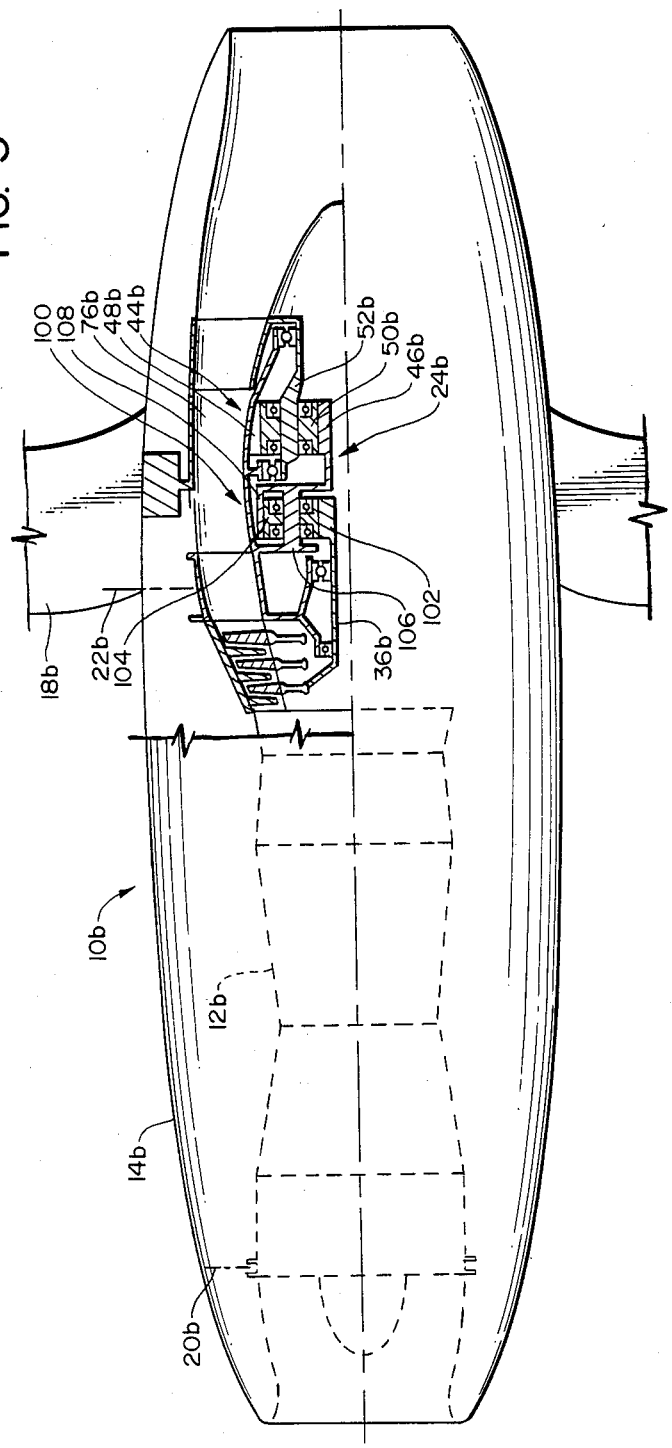

The third embodiment is installed in FIG. 3, and components which are similar to the first two embodiments will be distinguished from the embodiment by means of a "b" suffix to the numerical designations. The third embodiment is, like the first embodiment of FIG. 1, of a pusher configuration where the propeller blades 18b are mounted at the aft part of the nacelle structure 14b. The core engine 12b is the same as in the previous two embodiments. This third embodiment differs from the previous two embodiments primarily in the configuration of the transmission 24b, showing two planetary reduction gears in series.

As illustrated in FIG. 3, there is a rear planetary gear assembly 44b, and as in the prior embodiment, the ring gear 44b is fixed, while the planetary carrier 52b rotates so as to be the drive member for the propeller 18b. However, there is a second planetary assembly 100 which operatively interconnects the sun gear 46b of the gear assembly 44b with the shaft 36b. More specifically, this second planetary gear assembly 100 comprises a sun gear 102, a plurality of planetary gears 104, and a planet carrier 106 that is fixedly connected to stationary structure. The ring gear 108 of the planetary assembly 100 is fixedly connected to the sun gear 46b of the gear assembly 44b.

In operation, the shaft 36b rotates the sun gear 102, which in turn causes the ring gear 108 at a reduced speed. The ring gear 108 in turn causes the sun gear 46b to rotate to in turn cause rotation of the propeller 18b as described previously, with reference to the first embodiment of FIG. 1. The gaseous flow through the core engine 12b and through the passageway 76b is substantially the same as in the first embodiment.

It will be recognized that in this third embodiment, the diameter or radial dimension of the gear transmission 24 can be reduced somewhat from that shown in FIG. 1, but at the sacrifice of having additional transmission components.

Figure 4:
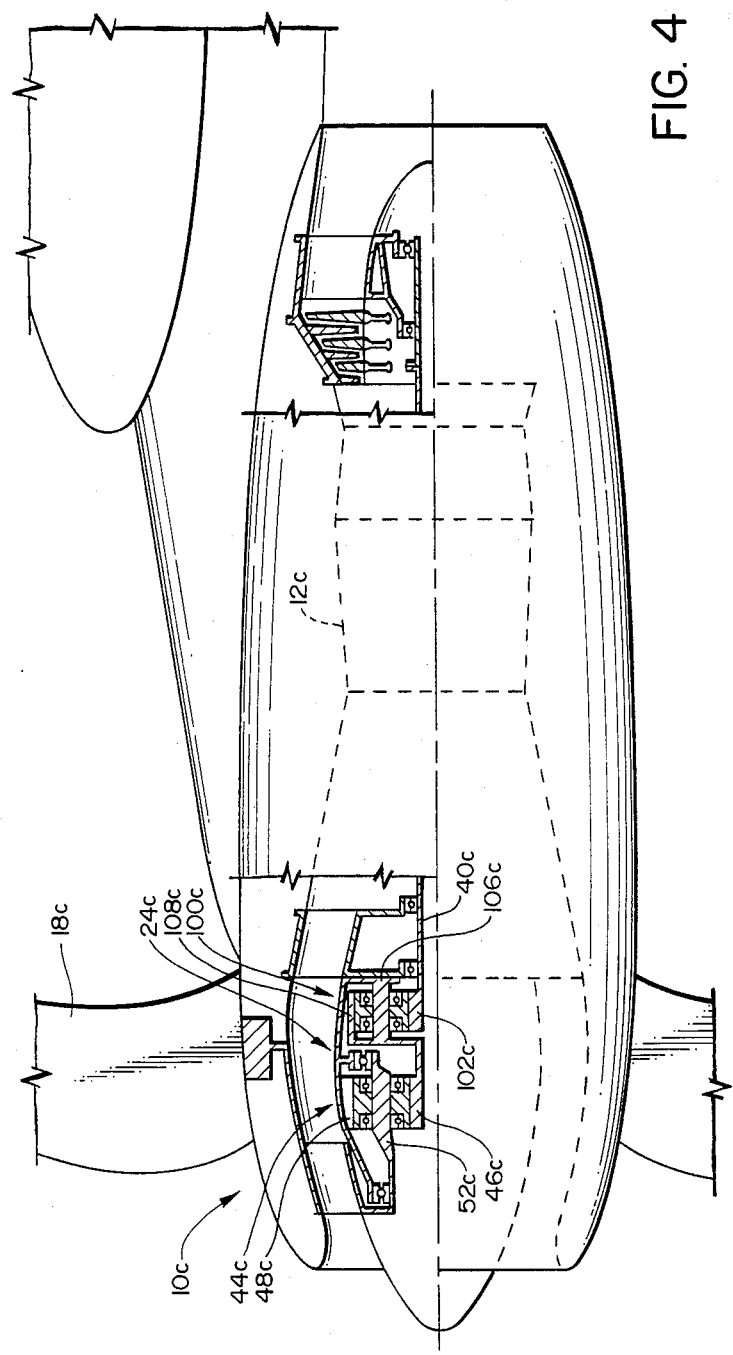

A fourth embodiment is shown in FIG. 4, and components of this fourth embodiment will be distinguished by a "c" suffix to the numerical designations. This fourth embodiment of FIG. 4 has a tractor configuration similar to the second embodiment of FIG. 2, and a drive transmission 24c similar to the drive transmission 24b of the third embodiment.

Thus, there is a planetary transmission 44b having a sun gear 46c, a fixedly mounted ring gear 48c, and a planetary carrier 52c that rotates the propeller 18c.

Then there is a second drive transmission 100c, and this has a sun gear 102c fixedly connected to the drive shaft 40c. The planetary carrier 106c is fixedly connected to stationary structure, while the ring gear 108c is connected to the sun gear 46c.

The gaseous flow path provided by this fourth embodiment is substantially the same as that of the second embodiment of FIG. 2. The action of the drive transmission 24c is substantially the same as that of the third embodiment of FIG. 3.

Figure 5:
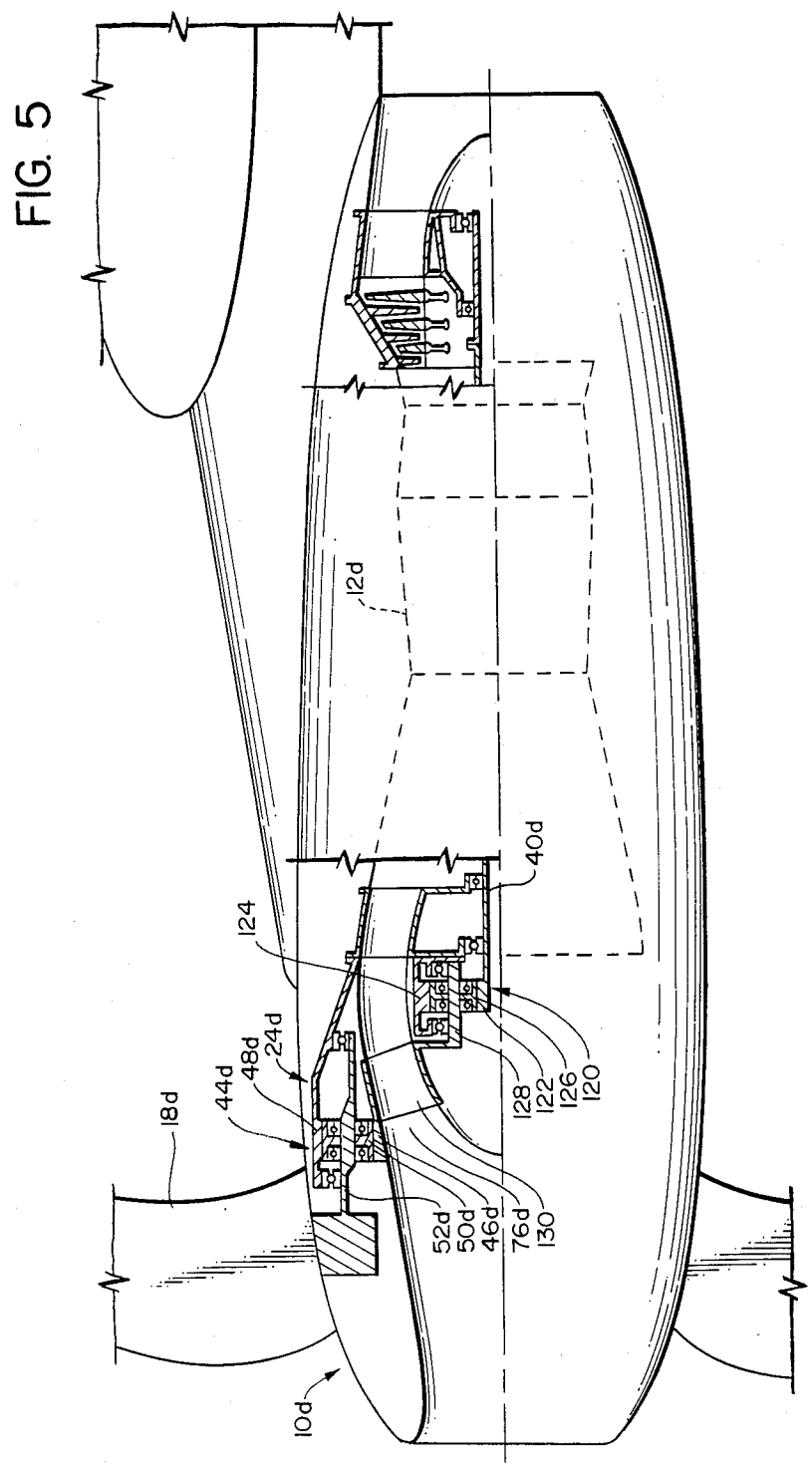

A fifth embodiment is shown in FIG. 5, and components of this fifth embodiment will be distinguished by a "d" suffix to the numerical designations. This has a tractor configuration. The drive transmission 24d comprises a planetary gear assembly 44d which comprises a sun gear 46d, a fixedly mounted ring gear 48d, planet gears 50d, and planetary carrier or spider 52d which drives the propeller 18d. However, the sun ger 46d is made as an annular member which is positioned radially outwardly of the gaseous flow passageway 76d so as to surround this passageway 76d. There is provided a second planetary gear assembly 120, which comprises a sun gear 122 fixedly connected to the forward end of the drive shaft 40d. There is a fixedly mounted ring gear 124, planetary gears 126, and a planetary carrier or spider 128 which is fixedly connected to an intermediate torque frame comprising torque frame struts/blades 130. These blades 130 are in turn fixedly connected to the sun gear 46d.

In operation, the gaseous flow path through the passageway 76d and through the core engine 12d is substantially the same as in the second and fourth embodiments of FIGS. 2 and 4, respectively.

With regard to the drive transmission 24d, the output of the planetary gear assembly 120 is through the planetary carrier 128 through the struts/blades 130 to drive the sun gear 46d. The output from the planetary assembly 44d is through the planetary carrier 52d to drive the blades 18d.

Figure 6:
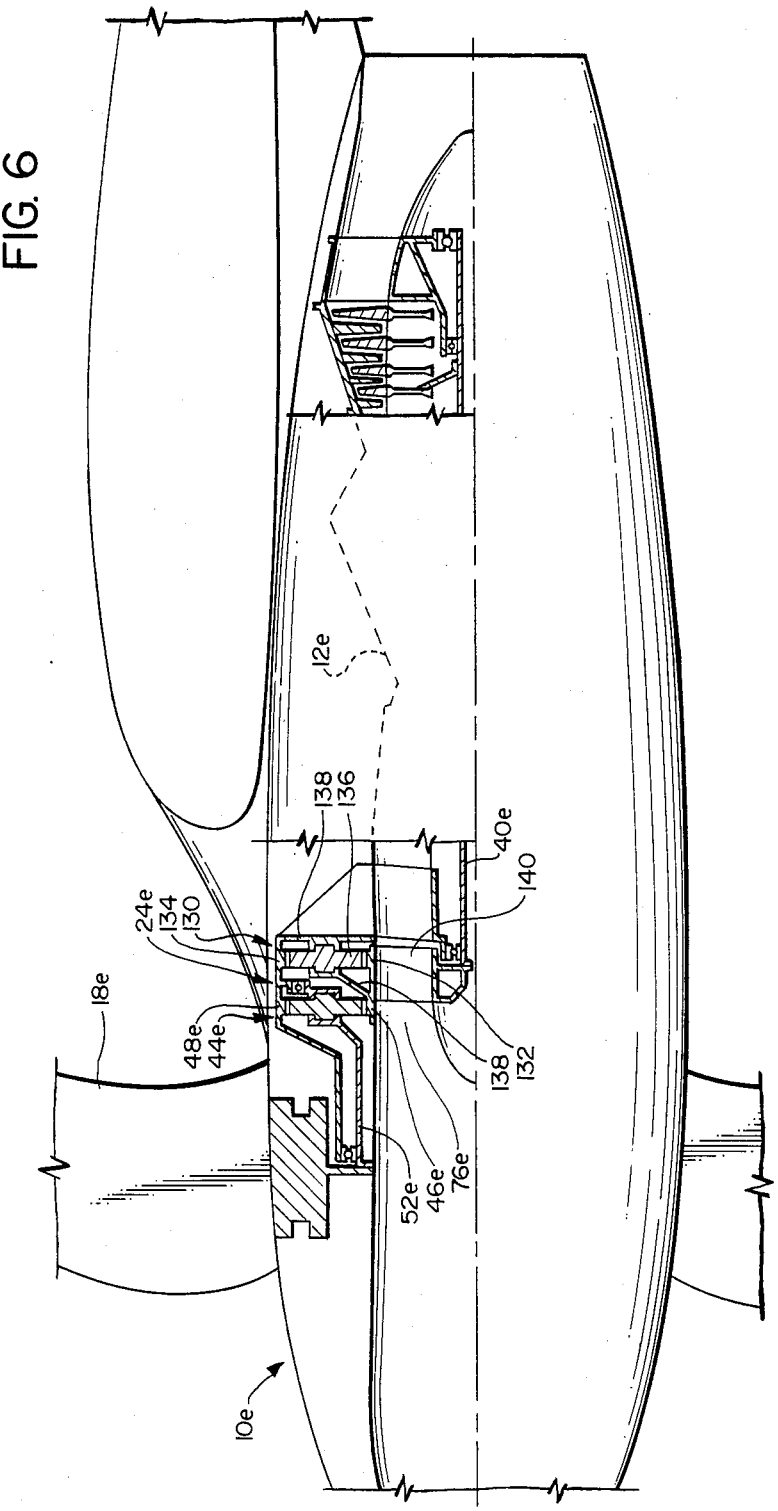

The sixth embodiment of the present invention is illustrated in FIG. 6. Components of this sixth embodiment will be distinguished by adding a "e" suffix to the numerical designations. This incorporates the tractor configuration.

In this sixth embodiment, the drive transmission 24e comprises a forward planetary assembly 44e, having a stationary ring gear 48e and an annular sun gear 46e positioned radially outwardly of the passageway 76e. The planetary carrier 52e is the power output from the planetary gear assembly 44e, and this drives the propellers 18e.

There is a second planetary assembly 130 positioned rearwardly of the planetary assembly 44e, and this comprises a sun gear 132, a ring gear 134, a set of planetary gears 136, and a planetary carrier 138. The ring gear 132 has an annular configuration and is positioned rearwardly outwardly of the passageway 76e so as to surround the passageway 76e. This ring gear 132 is connected by struts/compressor blades 140 to the forward end of the drive shaft 40e. The planetary carrier 138 is connected to the sun gear 46e.

In operation, the gaseous flow path 76e of this sixth embodiment is somewhat similar to that of the fifth embodiment of FIG. 5, except that the intermediate planetary gear assebly 130 is positioned outwardly of the gaseous flow path 76e. The shaft 40e acts through the blades/struts 140 to rotate the sun gear 132, which in turn causes rotation of the spider or planetary carrier 138 to cause rotation of the sun gear 46e. Then, as in the previous embodiments, the planetary carrier 52e powers the propeller blades 18e.

Figure 9:
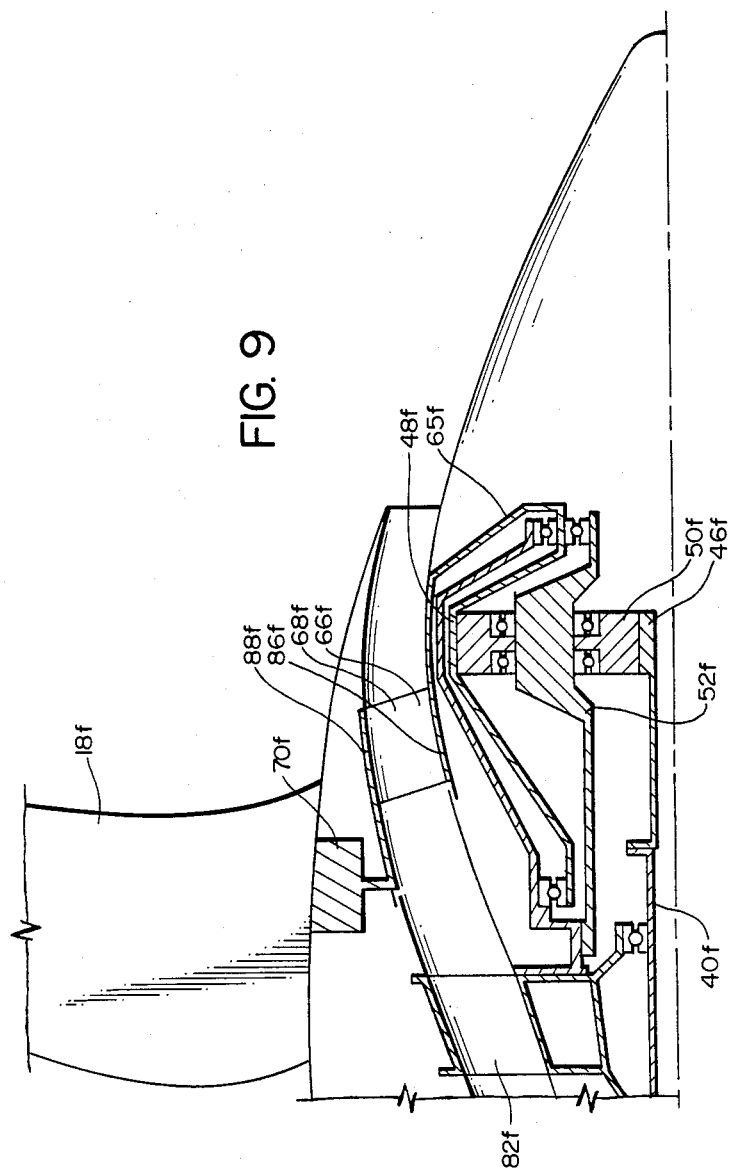
FIG. 9 is a schematic drawing, similar to FIG. 1, showing a seventh embodiment.

FIG. 9 shows a seventh embodiment of the present invention which is quite similar to the first embodiment of FIG. 1, except that the drive output is from the sun gear, rather than the planetary carrier. For ease of illustration, only the aft portion of the total engine is shown, and the components of this seventh embodiment are distinguished by an "f" suffix. Thus, there is the power turbine 32f connected through the shaft 40f to the sun gear 46f. The planetary carrier 52f is fixably connected to stationary structure. The ring gear 48f is connected to the torque frame 66f which in turn connects through the struts/blades 68f to the ring mount 70 that in turn connects to the propeller 18f.

Thus, it can be appreciated that the overall mode of operation of this seventh embodiment is substantially the same as in the first embodiment, except that, as mentioned above, the planetary carrier 52f is stationary, while the drive is fro the ring gear 48f.

It is apparent that various modifications could be made to the present invention without departing from the basic teachings thereof.

What is claimed and desired to be secured by Letters Patent of the United States is:

1. A turboprop propulsion assembly comprising:
   a. a nacelle having a support structure;
   b. a gas generating and power section mounted in said support structure and having a longitudinally extending operating axis, said gas generating and power section comprising:
      1. a compressor means to receive intake air;
      2. a burner means to receive air from the compressor and burn fuel therein to create a gaseous combustion product;
      3. a turbine means having a turbine blade means centered on, and rotatable about, said operating axis;
   c. said nacelle having a forward inlet and a rear exhaust nozzle, with said propulsion assembly defining a substantially continuous gaseous fluid flow path from said inlet through said gas generating said power section to said exhaust nozzle;
   d. a propeller mounted for rotation at a mounting location radially outward of said flow path;
   e. a planetary drive transmission comprising:
      1. an inner sun gear means of a relatively smaller diameter, mounted for rotation about said operating axis and operatively connected to said turbine means so as to be driven thereby;
      2. a ring gear means of a relatively larger diameter, positioned radially outwardly of said sun gear and centered on said operating axis;
      3. a planetary means comprising planetary gear means rotatable about axis means generally parallel to said operating axis and drivingly interconnected between the sun gear means and the ring gear means, and further comprising planet carrier means operatively connected to the planetary gear means;
   f. one of said ring gear means and said planet carrier means being mounted for rotation about said operating axis and also being drivingly connected to said propeller in a manner that rotation of said one of said ring gear means and said planet carrier means in response to being driven by said sun gear means causes rotation of said propeller;
   g. said planetary transmission being positioned at a planetary location spaced radially from said flow path in a manner that gaseous flow through said flow path at said planetary location has a substantial alignment component which is axially aligned relative to said operating axis,
   h. a gear box enclosing said planetary drive transmission;
   i. a torque frame means interconnected between said propeller and said one of said ring gear means and said planet carrier means, and also spaced axially from said propeller;
   j. at least two sets of bearing means positioned at axially spaced locations within said gear box to provide bearing support for said torque frame means.

2. The assembly as recited in claim 1, wherein said planetary drive transmission is positioned radially inwardly of said flow path, and said torque frame means extends from said one of said ring gear means and said planet carrier means through said flow path to connect to said propeller.

3. The assembly as recited in claim 2, wherein said flow path has a flow section positioned rearwardly of said turbine means, and said torque frame means extends through said flow section.

4. The assembly as recited in claim 3, wherein said torque frame means comprises strut means contoured to react to gaseous flow from said turbine means to create a power input to said propeller.

5. The assembly as recited in claim 3, wherein said propeller is mounted to a rear portion of said support structure in a pusher configuration.

6. The assembly as recited in claim 2, wherein said flow path has a flow section positioned forwardly of said compressor means and said torque frame means is connected between said one of said ring gear means and said planet carrier means through said flow section to connect to said propeller.

7. The assembly as recited in claim 6, wherein said torque frame means comprises strut means contoured to react to gaseous flow into said compressor means to create a supercharging effect to the compressor means.

8. The assembly as recited in claim 6, wherein said propeller is mounted to a forward portion of said support structure in a tractor configuration.

9. The assembly as recited in claim 1, wherein said planetary drive transmission is located radially outwardly of said flow path, and there is connecting means extending through said flow path and operatively connecting said turbine means with said sun gear means.

10. The assembly as recited in claim 9, wherein there is a path section of said path positioned forwardly of said compressor means, and said connecting means extends through said path section.

11. The assembly as recited in claim 10, wherein said connecting means comprises strut means extending through said path section.

12. The assembly as recited in claim 10, wherein said propeller is mounted to a forward portion of said support structure in a tractor configuration.

13. The assembly as recited in claim 9, wherein there is a path section of said path positioned rearwardly of said turbine means, and said connecting means extends through said path section.

14. The assembly as recited in claim 13, wherein said connecting means comprises strut contoured to engage gaseous exhaust from said turbine means to provide additional power to said propeller.

15. The assembly as recited in claim 13, wherein said propeller is mounted to a rear portion of said support structure in a pusher configuration.

16. The assembly as recited in claim 9, wherein there is a planetary drive assembly mounted radially inwardly of said flow path, and said planetary assembly is drivingly connected between said turbine means through said connecting means to the sun gear of the planetary drive transmission in a manner to cause speed reduction of said sun gear means relative to said turbine means.

17. The assembly as recited in claim 16, wherein said planetary assembly comprises a second sun gear means operatively connected to said turbine means, a second ring gear means connected through said connecting means to said sun gear means of the planetary transmission, and second planetary means having a planetary carrier mounted so as to be stationary relative to said nacelle support structure.

18. The assembly as recited in claim 9, wherein there is a planetary assembly positioned radially outwardly of said fluid flow path, said planetary assembly being drivingly connected between said planetary transmissionand said turbine means.

19. The assembly as recited in claim 18, wherein said connecting means is operatively connected between said turbine means and a sun gear of said planetary assembly, said planetary assembly further comprising a second planetary means comprising a second planetary gear means and a second planetary carrier, said planetary carrier being connected to the sun gear means of the planetary transmission.

20. The assembly as recited in claim 1, wherein said propulsion assembly has a primary mount by which said gas generating and power system, said propeller and said drive transmission are mounted to said nacelle support structure, said primary mount being positioned immediately rearwardly of said turbine means and forwardly of said planetary drive transmission, with loads from said planetary drive transmission being transmitted to said primary mount.

21. The assembly as recited in claim 1, wherein said propulsion assembly has a primary mount by which said gas generating and power system, said propellers and said drive transmission are mounted to said nacelle support structure, said primary mount being positioned immediately forwardly of said compressor means and rearwardly of said planetary drive transmission, with loads from said planetary drive transmission being transmitted to said primary mount.

22. The assembly as recited in claim 1, wherein said turbne means comprises a first compressor turbine section having a drive connection to said compressor means, and a separate free turbine section powered independently of said turbine compressor section and operatively connected through said planetary drive transmission to said propeller.

23. The assembly as recited in claim 1, wherein said turbine means comprises at least one shared load turbine section having a drive connection through said planetary drive transmission to said propeller, and also having an operative drive connection to at least a portion of said compressor means.

24. A turboprop propulsion assembly comprising:
a. a nacelle having a support structure;
b. a gas generating and power section mounted in said support structure and having a longitudinally extending operating axis, said gas generating and power section comprising:
1. a compressor means to receive intake air;
2. a burner means to receive air from the compressor and burn fuel therein to create a gaseous combustion product;
3. a turbine means having a turbine blade means centered on, and rotatable about, said operating axis;
c. said nacelle having a foward inlet and a rear exhaust nozzle, with said propulsion assembly defining a substantially continuous gaseous fluid flow path from said inlet through said gas generating and power section to said exhaust nozzle;
d. a propeller mounted for rotation at a mounting location radially outward of said flow path;
e. a planetary drive transmission comprising:

1. an inner sun gear means of a relatively smaller diameter, mounted for rotation about said operating axis and operatively connected to said turbine means so as to be driven thereby;
2. a ring gear means of a relatively larger diameter, positioned radially outwardly of said sun gear and centered on said operating axis, and also connected to said support structure so as to be nonrotatable with respect thereto;
3. a planetary means comprising planetary gear means rotatable about axis means generally parallel to said operating axis and drivingly interconnected between the sun gear means and the ring gear means, and further comprising planet carrier means operatively connected to the planetary gear means;
f. said planet carrier means being mounted for rotation about said operating axis and also being drivingly connected to said propeller in a manner that rotation of said planet carrier means in response to being driven by said sun gear means causes rotation of said propeller; and
g. said planetary transmission being positioned at a planetary location spaced radially from said flow path in a manner that gaseous flow through said flow path at said planetary location has a substantial alignment component which is axially aligned relative to said operating axis.

25. The assembly as recited in claim 24, wherein said planetary drive transmission is positioned radially inwardly of said flow path, and there is torque frame means connecting from said planet carrier means through said flow path to connect to said propeller.

26. The assembly as recited in claim 25, wherein said flow path has a flow section positioned rearwardly of said turbine means, and said torque frame means extends through said flow section.

27. The assembly as recited in claim 26, wherein said propeller is mounted to a rear portion of said support structure in a pusher configuration.

28. The assembly as recited in claim 24, wherein said flow path has a flow section positiond forwardly of said compressor means and there is torque frame means connected between said planet carrier means through said flow section to connect to said propeller.

29. The assembly as recited in claim 28, wherein said propeller is mounted to a forward portion of said support structure in a tractor configuration.

30. The assembly as recited in claim 24, wherein said planetary drive transmission is located radially outwardly of said flow path, and there is connecting means extending through said flow path and operatively connecting said turbine means with said sun gear means.

31. The assembly as recited in claim 30, wherein there is a planetary drive assembly mounted radially inwardly of said flow path, and said planetary assembly is drivingly connected between said turbine means through said connecting means to the sun means of the planetary drive transmission in a manner to cause speed reduction of said sun gear means relative to said turbine means.

32. The assembly as recited in claim 31, wherein there is a planetary assembly positioned radially outwardly of said fluid flow path, said planetary assembly being drivingly connected between said planetary transmission and said turbine section.

33. The assembly as recited in claim 24, wherein said propulsion assembly has a primary mount by which said gas generating and power system, said propeller and said drive transmission are mounted to said nacelle support structure, said primary mount being positioned immediately rearwardly of said turbine means and forwardly of said planetary drive transmission, with loads from said planetary drive transmission being transmitted to said primary mount.

34. The assembly as recited in claim 24, wherein said propulsion assembly has a primary mount by which said gas generating and power system, said propeller and said drive transmission are mounted to said nacelle support structure, said primary mount being positioned immediately forwardly of said compressor means and rearwardly of said planetary drive transmission, with loads from said planetary drive transmission being transmitted to said primary mount.

35. The assembly as recited in claim 24, wherein said propeller is mounted to a rear portion of said support structure in a pusher configuration, and there is a rear plug structure mounted at said operating axis and rotatable with said planet carrier.

36. The assembly as recited in claim 24, wherein said propeller is mounted to a forward portion of said supportstructure in a tractor configuration, and there is a front spinner structure mounted at said operating axis and rotatable with said planet carrier.

* * * * *